US009038080B2

(12) United States Patent
Venkataraman et al.

(10) Patent No.: US 9,038,080 B2
(45) Date of Patent: May 19, 2015

(54) METHOD AND SYSTEM FOR HETEROGENEOUS FILTERING FRAMEWORK FOR SHARED MEMORY DATA ACCESS HAZARD REPORTS

(71) Applicant: NVIDIA Corporation, Santa Clara, CA (US)

(72) Inventors: Vyas Venkataraman, Santa Clara, CA (US); Manjunath Kudlur, San Jose, CA (US); Vinod Grover, Mercer Island, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 185 days.

(21) Appl. No.: 13/728,968

(22) Filed: Dec. 27, 2012

(65) Prior Publication Data

US 2013/0305252 A1 Nov. 14, 2013

Related U.S. Application Data

(60) Provisional application No. 61/644,979, filed on May 9, 2012.

(51) Int. Cl.
*G06F 9/46* (2006.01)
*G06F 3/06* (2006.01)
*G06F 9/48* (2006.01)
*G06F 11/07* (2006.01)

(52) U.S. Cl.
CPC ............ *G06F 3/0653* (2013.01); *G06F 9/4887* (2013.01); *G06F 9/4881* (2013.01); *G06F 11/0715* (2013.01); *G06F 11/0751* (2013.01)

(58) Field of Classification Search
CPC ... G06F 9/4881; G06F 9/4843; G06F 9/4887; G06F 9/46; G06F 9/52; G06F 9/526; G06F 9/3004; G06F 3/0653; G06F 11/0715; G06F 11/0751; G06F 11/0787; G06F 11/3072
See application file for complete search history.

(56) References Cited

U.S. PATENT DOCUMENTS

| | | | |
|---|---|---|---|
| 6,571,320 B1 * | 5/2003 | Hachmann | 711/141 |
| 7,366,956 B2 * | 4/2008 | Karp et al. | 714/38.14 |
| 7,516,446 B2 * | 4/2009 | Choi et al. | 717/128 |
| 7,549,150 B2 * | 6/2009 | Yu | 718/108 |

(Continued)

OTHER PUBLICATIONS

Sathiyamurthy et al. "Automated Reasoning Tool for the Detection of Race Conditions in Web Services", 2007 IEEE, pp. 61-65.*

(Continued)

*Primary Examiner* — Van Nguyen

(57) ABSTRACT

A system and method for detecting, filtering, prioritizing and reporting shared memory hazards are disclosed. The method includes, for a unit of hardware operating on a block of threads, mapping a plurality of shared memory locations assigned to the unit to a tracking table. The tracking table comprises initialization information for each shared memory location. The method also includes, for an instruction of a program within a barrier region, identifying a potential conflict by identifying a second access to a location in shared memory within a block of threads executed by the hardware unit. First information associated with a first access and second information associated with the second access to the location is determined. Filter criteria is applied to the first and second information to determine whether the instruction causes a reportable hazard. The instruction is reported when it causes the reportable hazard.

20 Claims, 11 Drawing Sheets

(56) References Cited

U.S. PATENT DOCUMENTS

| | | | |
|---|---|---|---|
| 7,584,332 B2 * | 9/2009 | Kogge et al. | 711/147 |
| 7,757,237 B2 * | 7/2010 | Karp et al. | 718/108 |
| 7,992,146 B2 * | 8/2011 | Krauss | 718/100 |
| 8,028,133 B2 * | 9/2011 | Dice et al. | 711/152 |
| 8,095,750 B2 * | 1/2012 | Heller, Jr. | 711/156 |
| 8,117,403 B2 * | 2/2012 | Heller et al. | 711/150 |
| 8,321,637 B2 * | 11/2012 | Baum et al. | 711/150 |
| 2006/0218553 A1 * | 9/2006 | Dore et al. | 718/102 |
| 2013/0304996 A1 | 11/2013 | Venkataraman et al. | |
| 2014/0281727 A1 | 9/2014 | Venkataraman | |

OTHER PUBLICATIONS

Butelle et al. "A Model for Coherent Distributed Memory for Race Condition Detection", 2011 IEEE, pp. 584-590.*

Higuera-Toledano "Towards an Analysis of Race Carrier Conditions in Real-time Java", "A Model for Coherent Distributed Memory for Race Condition Detection", 2006 IEEE, pp. 1-7.*

* cited by examiner

| INITIALIZE 810 | OLD R/W 820 | CURRENT R/W 830 | ACTION 840 | |
|---|---|---|---|---|
| 0 | | | FIRST UPDATE – DO TRACKING UPDATE AND RELEASE LOCK | 850 |
| 1 | R | R | DO TRACKING UPDATE AND RELEASE LOCK | 860 |
| 1 | R | W | WRITE-AFTER-READ (WAR) HAZARD, REPORT HAZARD (E.G., BUFFERED DRAIN THROUGH EXCEPTION), DO TRACKING UPDATE, AND RELEASE LOCK | 870 |
| 1 | W | R | READ-AFTER-WRITE (RAW) HAZARD, REPORT HAZARD (E.G., BUFFERED DRAIN THROUGH EXCEPTION), DO TRACKING UPDATE, AND RELEASE LOCK | 880 |
| 1 | W | W | WRITE-AFTER-WRITE (WAW) HAZARD, REPORT HAZARD (E.G., BUFFERED DRAIN THROUGH EXCEPTION), DO TRACKING UPDATE, AND RELEASE LOCK | 890 |

# METHOD AND SYSTEM FOR HETEROGENEOUS FILTERING FRAMEWORK FOR SHARED MEMORY DATA ACCESS HAZARD REPORTS

CROSS REFERENCE TO RELATED APPLICATIONS

This application is a conversion of and claims priority to and the benefit of Provisional Patent Application No. 61/644, 979, entitled "METHOD AND SYSTEM FOR HETEROGENEOUS FILTERING FRAMEWORK FOR SHARED MEMORY DATA ACCESS HAZARD REPORTS," having a filing Date of May 9, 2012, which is herein incorporated by reference in its entirety.

This application is related to concurrently filed patent application Ser. No. 13/728,990, entitled "METHOD AND SYSTEM FOR RUN TIME DETECTION OF SHARED MEMORY DATA ACCESS HAZARDS," having a filing date of Dec. 27, 2012, which is herein incorporated by reference in its entirety.

BACKGROUND

In a multi-threaded environment, race conditions related to shared memory access can result in incorrect values being computed or even in incorrect program execution. A data access hazard occurs when two or more accesses (e.g., read and/or write) to the same location in memory may occur without any guarantee of ordering between the accesses. When one ordering of thread accesses to the memory location may provide a first result, whereas a different ordering of thread accesses may provide a different, second result, this is referred to as a data race condition.

In the case of multi-threaded processing environments, the large number of simultaneous executing threads will increase the possibility of creating such race conditions or errors. That is, a processor system may include an operating system that controls hardware resources that access a common memory location when executing a program. For instance, a general purpose GPU (GPGPU) programming environment may include thousands of GPGPUs, each running tens of thousands of threads, processing the same code in order to reach a result, such as, rendering a graphical image. These large numbers of threads are susceptible to race conditions that may be propagated throughout the computation, especially if all the GPGPUs are executing identical code.

Traditional race detection schemes rely on static analysis using symbolic evaluation of all possible execution paths to perform detection of potential hazards. However, not all such execution paths can be taken when the program is actually executed. Another approach is via simulation of programs. In such schemes, the processing unit is simulated in a software environment, and the program is executed in the simulation environment. However, both static analysis and simulation based approaches for race detection are not well suited to handle cases where thousands of threads could potentially be executing simultaneously. Additionally, since the simulated environment is not hardware based, it may not give a true analysis of race conditions when executing the program on the actual hardware.

Further, a common problem for tools that report data access hazards includes the high rate of false positives (i.e., false reports of data access hazards that cause races). This occurs when information about the hazard of interest to the user is hidden among other hazard reports. This is of an increasing concern when a large number of concurrent threads are executing a program.

SUMMARY

A computer implemented method and system for identifying hazards that could result in race conditions or shared memory hazards are disclosed. The computer implemented method includes, for a unit of hardware operating on a block of threads, mapping a plurality of shared memory locations assigned to the unit to a tracking table. The tracking table comprises an initialization bit for each shared memory location, in one embodiment. More particularly, the tracking table includes two state tracking bits, the initialization bit and a read/write bit that indicates the access type of the last access, in another embodiment. The method also includes, for an instruction of a program within a barrier region, identifying a second access to a location in shared memory within the block of threads. The second access is identified based on a status of the initialization bit and/or state tracking bits. The method also includes determining a hazard based on a first type of access associated with a first access to the location and a second type of access associated with a second access to the location. Information related to the first access is provided in the table.

In another embodiment, a system for detecting race conditions or shared memory hazards in a multi-threaded environment is disclosed. The multi-threaded environment includes a plurality of units of hardware operating on different blocks of threads. The system also includes a plurality of tracking tables, wherein units correspond to tracking tables in a one-to-one relationship. Also, each of the tracking tables comprises state tracking bits (e.g., initialization bit and/or read/write bit that indicates the access type of the last access) for a corresponding location of a plurality of shared memory locations assigned to a corresponding unit. That is, each tracking table is associated with a subset of the plurality of shared memory locations, wherein the subset is assigned to a corresponding unit. More particularly, for each memory location of the subset, a corresponding tracking table includes the state tracking bits. The system also includes a shared memory access detector for identifying a second access to a location in shared memory within the block of threads. The identification of the second access is based on a status of corresponding state tracking bits. The second access is associated with an instruction of a program within a barrier region. The system also includes a hazard detector for determining a hazard based on a first type of access associated with a first access to the location and a second type of access associated with a second access to the location.

A computer implemented method and system for reporting race conditions or shared memory hazards are disclosed. The computer implemented method includes, for a unit of hardware operating on a block of threads, mapping a plurality of shared memory locations assigned to the unit to a tracking table. The tracking table comprises initialization information for each shared memory location. The method also includes, for an instruction of a program within a barrier region, identifying a potential conflict by identifying a second access to a location in shared memory within a block of threads executed by the hardware unit. Identification of the second access is achieved using the initialization information. First information associated with a first access and second information associated with the second access to the location is determined. Filter criteria is applied to the first and second information to determine whether the instruction causes a reportable hazard. The full hazard information is reported when it causes the reportable hazard. The filter criteria can also be used to determine the priority of a hazard, to indicate its severity. This is implemented in both an on-line components that are executed while the application executes and offline components that are executed once all or part of the online execution is complete.

In another embodiment, a system for detecting race conditions or shared memory hazards in a multi-threaded environment is disclosed. The multi-threaded environment includes a plurality of units of hardware operating on a block of threads. The system also includes a plurality of tracking tables, wherein units correspond to tracking tables in a one-to-one relationship. Also, each of the tracking tables comprises initialization information for a corresponding location of a plurality of shared memory locations assigned to a corresponding unit. That is, each tracking table is associated with a subset of the plurality of shared memory locations, wherein the subset is assigned to a corresponding unit. More particularly, for each memory location of the subset, a corresponding tracking table includes state tracking information (e.g., an initialization bit and/or read/write access information that indicates the type of access for the last access). The system also includes a shared memory access detector for identifying a potential conflict caused by the instruction. This is achieved by identifying a second access to a location in shared memory within the block of threads. The identification of the second access is based on a status of corresponding initialization information. The second access is associated with an instruction of a program within a barrier region, wherein the instruction is executed online through a block processor. An information parser is included within the system for determining first information associated with a first access to the location and second information associated with the second access to the location. A filter is included when the system for determining whether the first information and the second information matches filter criteria indicating the instruction causes a reportable hazard. The system also includes a reporting module for reporting the instruction when said instruction causes the reportable hazard.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 8 is a diagram of a state table indicating when hazards occur indicating a race condition in executable code of a program, in accordance with one embodiment of the present disclosure.

DESCRIPTION

Figure 1:
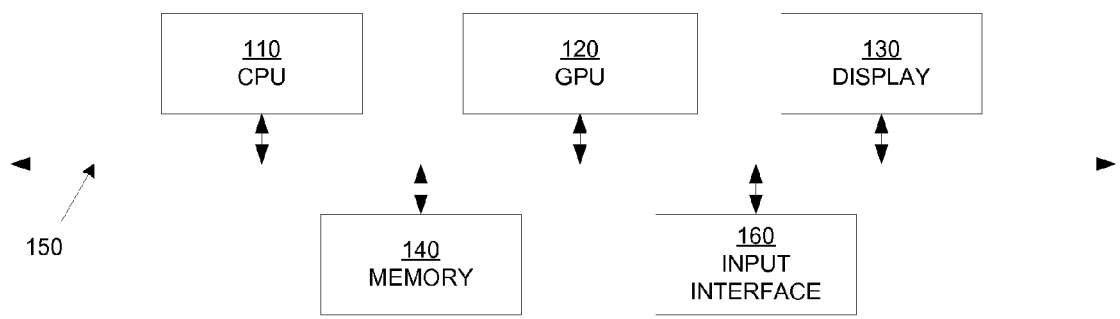
FIG. 1 depicts a block diagram of an exemplary computer system suitable for implementing the present methods, in accordance with one embodiment of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "applying," "binary patching," "mapping," "identifying," "determining," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

Flowcharts are provided of examples of computer-implemented methods for processing data according to embodiments of the present invention. Although specific steps are disclosed in the flowcharts, such steps are exemplary. That is, embodiments of the present invention are well-suited to performing various other steps or variations of the steps recited in the flowcharts.

Embodiments of the present invention described herein are discussed within the context of hardware-based components configured for monitoring and executing instructions. That is, embodiments of the present invention are implemented within hardware devices of a micro-architecture, and are configured for monitoring for critical stall conditions and performing appropriate clock-gating for purposes of power management.

Other embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a computing system 100 capable of implementing embodiments of the present disclosure. Computing system 100 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 110 and a system memory 140.

Both the central processing unit (CPU) 110 and the graphics processing unit (GPU) 120 are coupled to memory 140. System memory 140 generally represents any type or form of volatile or non-volatile storage device or medium capable of storing data and/or other computer-readable instructions. Examples of system memory 140 include, without limitation, RAM, ROM, flash memory, or any other suitable memory device. In the example of FIG. 1, memory 140 is a shared memory, whereby the memory stores instructions and data for both the CPU 110 and the GPU 120. Alternatively, there may be separate memories dedicated to the CPU 110 and the GPU 120, respectively. The memory can include a frame buffer for storing pixel data that drives a display screen 130.

The system 100 includes a user interface 160 that, in one implementation, includes an on-screen cursor control device. The user interface may include a keyboard, a mouse, and/or a touch screen device (a touchpad).

CPU 110 and/or GPU 120 generally represent any type or form of processing unit capable of processing data or interpreting and executing instructions. In certain embodiments, processors 110 and/or 120 may receive instructions from a software application or hardware module. These instructions may cause processors 110 and/or 120 to perform the functions of one or more of the example embodiments described and/or illustrated herein. For example, processors 110 and/or 120 may perform and/or be a means for performing, either alone or in combination with other elements, one or more of the monitoring, determining, gating, and detecting, or the like described herein. Processors 110 and/or 120 may also perform and/or be a means for performing any other steps, methods, or processes described and/or illustrated herein.

In some embodiments, the computer-readable medium containing a computer program may be loaded into computing system 100. All or a portion of the computer program stored on the computer-readable medium may then be stored in system memory 140 and/or various portions of storage devices. When executed by processors 110 and/or 120, a computer program loaded into computing system 100 may cause processor 110 and/or 120 to perform and/or be a means for performing the functions of the example embodiments described and/or illustrated herein. Additionally or alternatively, the example embodiments described and/or illustrated herein may be implemented in firmware and/or hardware.

Accordingly, embodiments of the present invention provide for run time detection of shared memory hazards using a fixed size tracking table that is associated with one or more block processors, wherein each block processor is associated with a predetermined number of processing threads. As such, only actual data access hazards in the executed program are detected. Further, this reduces the rate of potential false positives compared to other race detection tools, such as symbolic execution. Additionally, embodiments of the present invention provide for detection of shared memory hazards through binary modification of the executable, which reduces the need for additional debug information. This allows for the detection of hazards in optimized applications, as well as applications for which source code may not be available. Further, embodiments of the present invention are configured to handle a large number of concurrent threads through the use of a fine granularity lock on each entry of the table to serialize accesses to a particular shared memory location when executing a block of threads. In addition, embodiments of the present invention store the frequently accessed tracking data on the device, thereby increasing performance by reducing synchronization efforts with a host computer. Further, embodiments of the present invention provide for byte level accuracy for hazard detection, thereby allowing detection of races that occur on aliased locations.

Run Time Detection of Shared Memory Data Access Hazards

Figure 2:
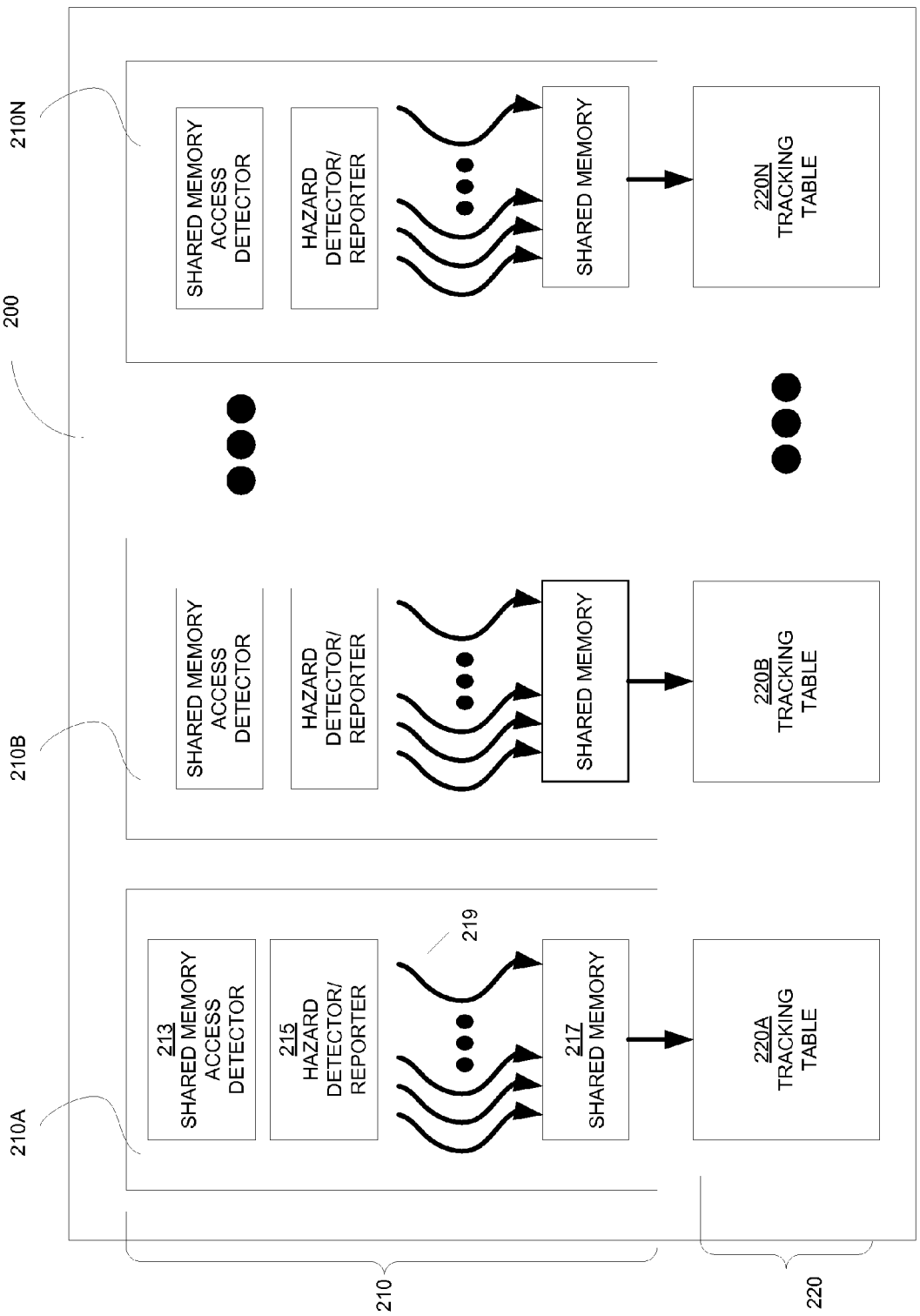
FIG. 2 is a block diagram of an exemplary multi-threaded processing system configured to implement online detection of race conditions in executable code of a program, in accordance with one embodiment of the present disclosure.

FIG. 2 is a block diagram of an exemplary multi-threaded processing system 200 configured to implement online detection of race conditions in executable code of a program, in accordance with one embodiment of the present disclosure. The processing system 200 may be implemented within system 100 of FIG. 1, in embodiments of the present invention.

As shown in FIG. 2, a processing system 200 includes a plurality of units of hardware or block processors 210, including block processor 210A, 210B, and on up to 210N. For instance, processing system 200 may comprise a central processing unit (CPU), graphics processing unit (GPU), general purpose graphics processing unit (GPGPU), etc. In a multi-threaded environment, each block processor is configured to perform specialized functions or general purpose instruction, and may include various types of memory and a tracking table. Additionally, each block processor is configured to concurrently execute a group or block of threads. For instance, each block multi-processor may comprise one or more stream processors, each of which handles one or more threads in a group of threads that is assigned to a particular block by a scheduler (not shown) or operating system (not shown). In one implementation, a warp size defines the group or number of threads that are running concurrently within a block processor.

For illustration, each block processor may include various components, such as, arithmetic logic unit (not shown), branching units (not shown), etc. As a representative example of the block processors in the plurality of block processors 210, the components of block processor 210A are described. For instance, block processor 210A is assigned shared memory 217 used for executing instructions in a program. That is, shared memory is included that can be read or written to by any thread as executed by the block processor 210A. For instance, a group, block, or warp of threads 219 of execution are assigned to block 210A and have access to locations in shared memory 217. In one embodiment, shared memory is located in block processor 210A. In another embodiment, shared memory is located outside block processor 210A, but within processing system 200. In still another embodiment, shared memory 217 is separately or remotely located.

Additionally, processing system 200 includes a plurality of tracking tables 220. In particular, each block processor is associated with a corresponding tracking table in a one-to-one relationship, in one embodiment. For instance, block processor 210A is associated with tracking table 220A, block processor 210B is associated with tracking table 220B, and block processor 210N is associated with tracking table 220N. In another embodiment, a tracking table is universal to the block processors, in that any tracking table may be used by a block processor for purposes of detecting online shared memory hazards.

Moreover, the tracking table 220A includes information that is used to determine multiple accesses to a particular location in shared memory 217 for block processor 210A. For instance, an initialization bit is included within tracking table 220A for a corresponding location (e.g., byte of memory) in shared memory 217 that is assigned to block processor 210A. Embodiments of the present invention support various sizes of the locations in shared memory. Additional information related to accesses to locations in shared memory 217 may be included within tracking table 220A, such as, type of access to a particular location, thread index, etc.

In addition, each block processor includes various components configured to perform online detection of race conditions or shared memory hazards. As shown in FIG. 2, one or more threads 219 possibly may access the same location in shared memory 217. Two or more accesses to a location in shared memory creates a hazard condition in that the order of execution between the two threads is not guaranteed in hardware. This may create results that may not be replicated. For instance, as a representative block for the plurality of blocks 210, block processor 210A includes a shared memory access detector 213 and hazard detector/reporter 215. More particularly, the shared memory access detector 213 in block processor 210A is configured to identify a second access to a location in shared memory 217 between a first and second thread of a block or warp of threads. The initialization bit is used to detect a potential hazard when a second access to the shared memory occurs, since the bit is set prior to the second access.

Two or more accesses to the location are associated with instructions of a program located within a barrier region of the program. Specifically, synchronization points of a program guarantee that all threads of any given block have completed execution up to that point. Synchronization points include the entry of a program, one or more exit of program, block wide synchronization primitive barrier instructions, etc. Entry and exit points provide implicit synchronization, whereas barrier instructions provide for explicit synchronization.

In addition, each block processor includes a hazard detector/hazard reporter. For instance, block processor 210A includes hazard detector/reporter 215. The hazard detector/reporter 215 is configured to determine a shared memory hazard based on a first type of access associated with a first access to the location and a second type of access associated with a second access to the location. The types of first and second accesses include reads and writes to the location, as will be further described in relation to FIG. 8.

The reporting portion of the hazard detector/reporter 215 is configured to determine information associated with the current instruction, and to report the hazard including information related to the hazard. In one embodiment, the information is used to attribute or identify the instruction causing the hazard, such as, program counter, the instruction, the thread and block indices, an address associated with the location in shared memory, etc.

Figure 3:
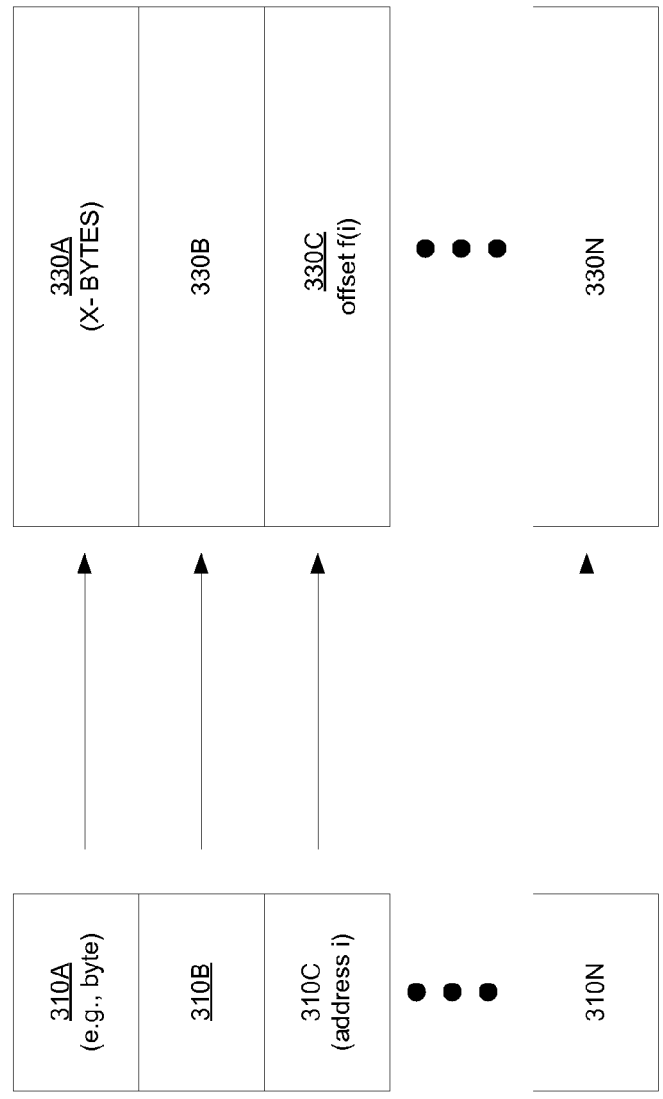
FIG. 3 is an illustration of the mapping between locations in shared memory and a tracking table used for online detection of race conditions in executable code of a program, in accordance with one embodiment of the present disclosure.

FIG. 3 is a diagram 300 of the mapping between locations in shared memory and a tracking table used for online detection of race conditions or shared memory hazards in executable code of a program, in accordance with one embodiment of the present disclosure. That is, shared memory 310 is mapped to a corresponding tracking table 330, in a one-to-one relationship.

As shown, shared memory 310 includes one or more locations 310A-N. In one embodiment, each location is defined as one byte of memory (e.g., 8 bits). Other embodiments are well suited to supporting locations having other sizes of memory. In addition, location 310C comprises an offset "i" from the beginning of shared memory 310, which is used to determine the corresponding mapped location and offset in tracking table 330.

In one embodiment, tracking table 330 is located in global memory (not shown). The global memory is coupled to the processor system that includes the plurality of blocks or units of processors. Also, any thread of any of the plurality of block or unit processors can access any location in the global memory. As such, the tracking table 330 is located in the device of the processor system. In another embodiment, tracking table 330 is located in the block or unit processor.

As shown, tracking table 330 is sized to correspond to the allocated shared memory space in hardware, in accordance with one embodiment of the present disclosure. For instance, for a given block or unit processor used to process a warp or block of threads, there is a fixed size, shared memory space 310 that is allocated. The fixed sized, shared memory space 310 is mapped to corresponding entries in the tracking table 330.

Specifically, the fixed size, shared memory space 310 also determines the amount of space reserved in the tracking table 330. That is, for every location of shared memory 310, there is a correspondingly sized location in the tracking table 330. For instance, in one implementation location 310A is sized to one byte (e.g., 8 bits), and the corresponding location 330A in the tracking table 330 is sized as a function of the size of location 310A. Also, location 310B in shared memory 310 corresponds to location 330B in tracking table 330; location 310C in shared memory 310 corresponds to location 330C in tracking table 330; and location 310N in shared memory 310 corresponds to location 330N in tracking table 330.

In one embodiment, the tracking table corresponds to a hardware unit or block processor. As such, that tracking table is universal to any block or warp of threads being executed by the hardware unit. As such, there is no need to scale the tracking table to the size or number of threads being executed by a program. This is because the execution of the program is constrained by the number of hardware units or block processors available to execute the program. Accesses to a location by any block or warp of threads being executed by a block or unit processor is stored in the tracking table 330. This information is used to determine multiple accesses to a location in shared memory within a barrier region and identify shared memory hazards.

Additionally, the tracking table 330 is indexed by an offset to the shared memory 310. For instance, since the size of the tracking table is fixed and corresponds to the size of the shared memory 310, the partitions of tracking table 330 is known. That is, the size of location 330A, 330B, 330C, and 330N are approximately the same. As such, beginning with the staring address to tracking table 330, any offset of shared memory 310 to a given location in shared memory 310 (e.g., 310C with offset i) is associated with a corresponding offset into tracking table 330 (e.g., 330C with offset f(i)). As such, any access to a location in shared memory 310 is easily mapped or indexed to the corresponding tracking information in the tracking table 330.

Figure 4:
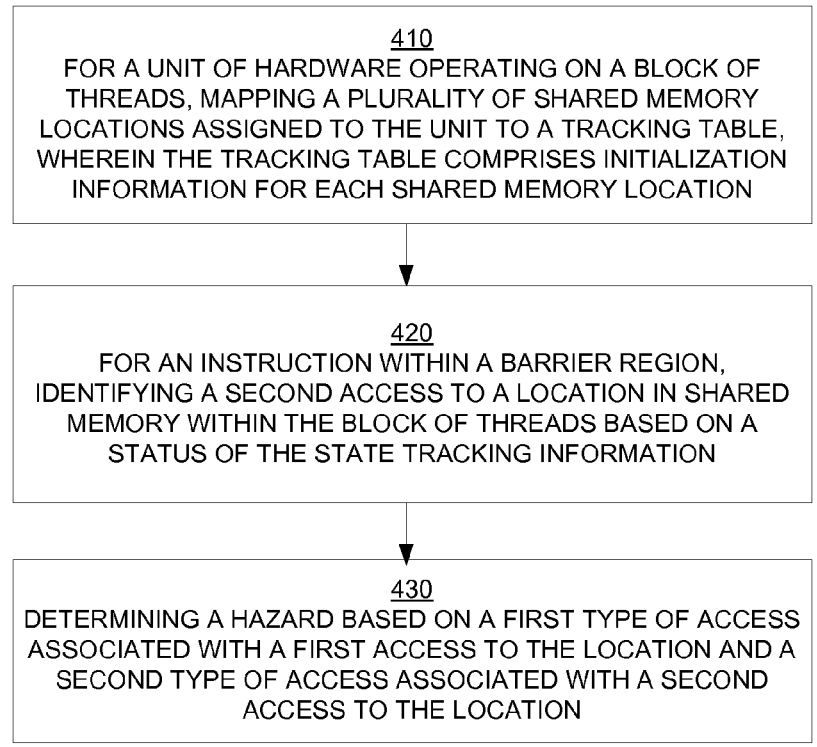
FIG. 4 is a flow diagram illustrating a method for online detection of race conditions in executable code of a program, in accordance with one embodiment of the present disclosure.

FIG. 4 is a flow diagram 400 illustrating a computer-implemented method for online detection of race conditions in executable code of a program, in accordance with one embodiment of the present disclosure. In another embodiment, flow diagram 400 is implemented within a computer system including a processor and memory coupled to the processor and having stored therein instructions that, if executed by the computer system causes the system to execute a method for online detection of race conditions in executable code of a program. In still another embodiment, instructions for performing a method are stored on a non-transitory computer-readable storage medium having computer-executable instructions for causing a computer system to perform a method for online detection of race conditions in executable code of a program. The method outlined in flow diagram 400 is implementable by one or more components of systems 100 and 200 of FIGS. 1 and 2, respectively.

Some embodiments of the present invention are optionally implemented online, in that the hazards are identified while executing the program on a hardware device. For example, the operations outlined in flow diagram 400 are not executed through simulated processing environment. In that manner, only actual data access hazards in the executed program are detected. This reduces the rate of potential false positives compared to other race detection tools, such as symbolic execution.

Additionally, some embodiments of the present invention provide for detection of shared memory hazards through binary modification of the executable, which reduces the need for additional debug information. This allows for the detection of hazards in optimized applications, as well as applications for which source code may not be available. In particular, at the assembly and/or binary level, the executable code is rewritten with a patch for every instruction that is accessing shared memory space, such as, reads and writes (e.g., loads and stores). The shared memory space was previously allocated to a block or unit processor, such that threads assigned for execution by the block processor can access that shared memory space. The binary patch includes code that performs hazard identification and tracking of the hazard, to include types of hazards, and where in the original code (to include offsets) the hazard exists.

The method includes mapping a plurality of shared memory locations to a tracking table at 410. The plurality of shared memory locations is allocated to a unit of hardware (e.g., block processor) that is configured to operate on a block or warp of threads. For instance, in one implementation, the unit of hardware comprises a streaming or shader multi-processor, which is a component of a GPU.

The tracking table is created for storing tracking data related to a corresponding shared memory that is allocated to a corresponding hardware unit. In one embodiment, the tracking table is stored in global memory, and is not accessible to the program user, or the original program. More particularly, the tracking table includes information related to accesses of the shared memory. For instance, a given entry in the tracking table provides information related to accesses (e.g., previous and current accesses) for a particular location in shared memory, such as, type of accesses (e.g., reads or writes), attribute information related to the instruction of the program, attribute information related to the thread such as the thread identifier, attribute information related to the shared memory location, etc. In particular, the tracking table entry includes state tracking information (e.g., two bits) for each shared memory location, wherein the state tracking information indicates whether the corresponding location has been previously accessed by an instruction.

In one embodiment, the tracking table is sized to correspond to the maximum size of the shared memory space allocated to a unit of hardware (e.g., streaming or shader core), wherein the hardware unit is executing a multi-threaded block. This is independent of the multi-threaded block of instructions that is to be executed, since the shared memory space will always be the same space that is accessed by the hardware unit that is executing any multi-threaded block.

In one embodiment, a processor system comprises a plurality of units of hardware that operate on one or more blocks or warps of threads of execution. The shared memory locations are allocated to each of the hardware units. In addition, shared memory locations are mapped to a corresponding tracking table, wherein hardware units corresponding to tracking tables in a one-to-one relationship. Also, each of the tracking tables comprises state tracking information for a corresponding location.

At 420, the method includes, for an instruction of an original program that is located within a barrier region, identifying a second access to a location in shared memory within a block or warp of threads. In one embodiment, the first and second accesses to the location are executed between two threads in the block of threads. Also, the two accesses (e.g., the first and second accesses) occurs within a barrier region, wherein the barrier region is defined between two states where all the threads in a program are known to be synchronized, either implicitly by the entry/exit points, or explicitly by the use of a block wide synchronization primitive such as a barrier instruction.

The identification of accesses, and more specifically, the identification of multiple accesses, to the same location in shared memory is accomplished using the state tracking information. In one embodiment, every access to the location in shared memory is updated with identifying access information at a corresponding entry in a corresponding tracking table. For instance, state tracking information comprising an initialization bit and an access type bit is included, wherein the initialization bit and the access type bits are set upon accessing the location. Thereafter, subsequent accesses to the same location are known based on the status of the state tracking bits as well as the state known by the accessing thread, and more specifically, whether the initialization bit is set or not set.

At 430, the method includes determining a shared memory hazard exists when there are multiple accesses to a location in shared memory. Specifically, a hazard is determined based on a first type of access that is associated with a first access to the location, and a second type of access that is associated with a second access to the location. As such, the state of the tracking table and the state of the accessing thread indicate that there are two accesses to the same location.

Figure 5:
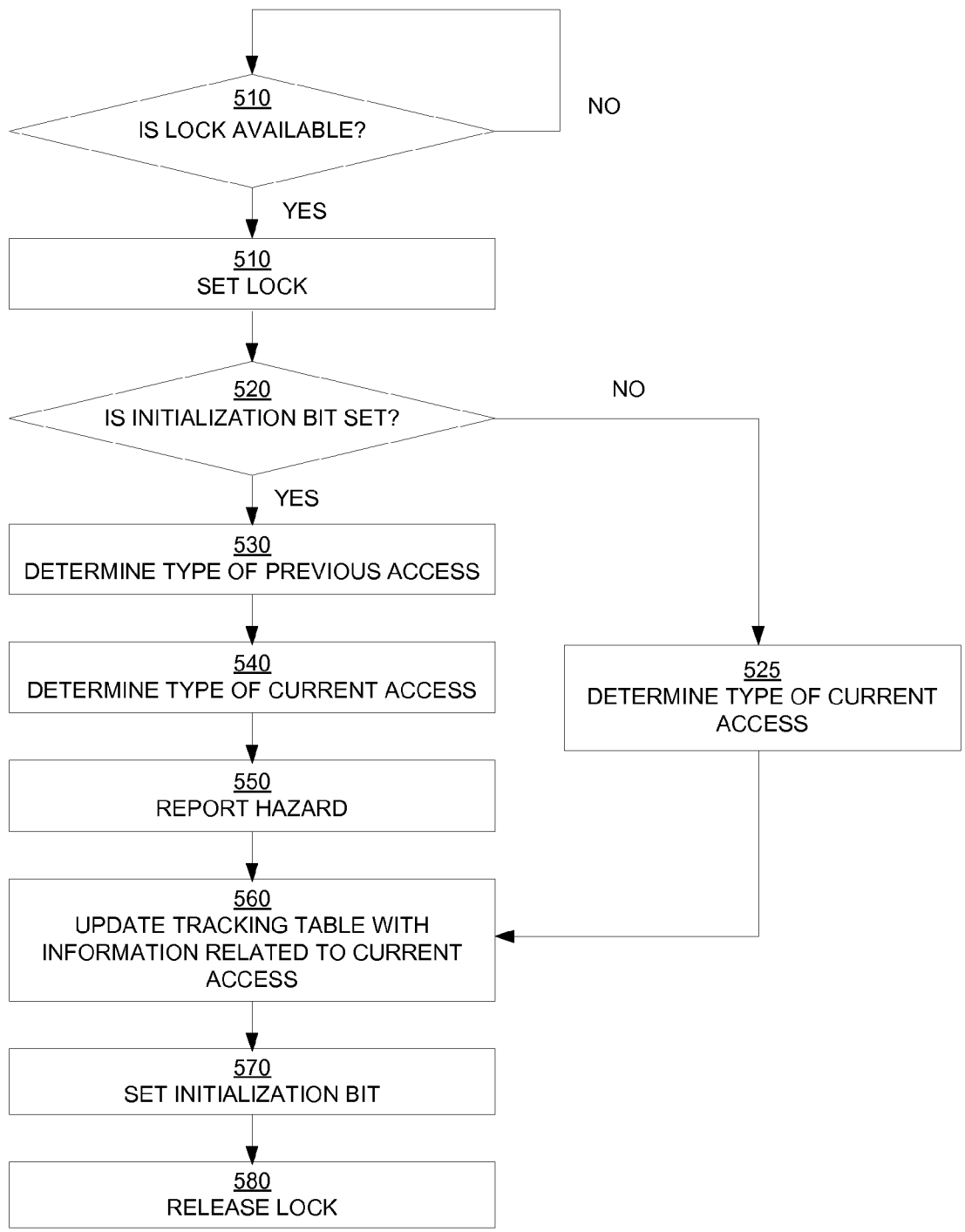
FIG. 5 is a flow diagram illustrating a method for online detection of race conditions in executable code of a program including the implementation of a tracking table for detecting multiple accesses to a location in shared memory, in accordance with one embodiment of the present disclosure.

FIG. 5 is a flow diagram 500 illustrating a computer implemented method for online detection of race conditions in executable code of a program including the implementation of a tracking table for detecting multiple accesses to a location in shared memory, in accordance with one embodiment of the present disclosure. Flow diagram 500 provides additional detail regarding the online detection of race conditions. In another embodiment, flow diagram 500 is implemented within a computer system including a processor and memory coupled to the processor and having stored therein instructions that, if executed by the computer system causes the system to execute a method for online detection of race conditions in executable code of a program. In still another embodiment, instructions for performing a method are stored on a non-transitory computer-readable storage medium having computer-executable instructions for causing a computer system to perform a method for online detection of race conditions in executable code of a program, as outlined in flow diagram 500. The method outlined in flow diagram 500 is implementable by one or more components of systems 100 and 200 of FIGS. 1 and 2, respectively.

Embodiments of the present invention as outlined in FIG. 5 are implemented online, in that the hazards are identified while executing the program on a hardware device. Further, embodiments of the present invention provide for detection of shared memory hazards through binary modification of the executable, which reduces the need for additional debug information. In particular, at the assembly and/or binary level, the executable code is rewritten with a patch for every instruction that is accessing shared memory space, such as, reads and writes (e.g., loads and stores). The shared memory space was previously allocated to a block or unit processor, such that threads assigned for execution by the block processor can access that shared memory space. The binary patch includes code that performs hazard identification and tracking of the hazard, to include types of hazards, and where in the original code (to include offsets) the hazard exists.

The method outlined in FIG. 5 is performed at each access to a location in shared memory within a block or warp of threads as executed by a block-processor. The block-processor has allocated shared memory, to include one or more locations in shared memory. Additionally, a corresponding tracking table includes entries that correspond to each location. The method outlined in FIG. 5 is performed to identify shared memory hazards present within instructions that occur within a barrier region, as previously discussed.

At each access to the location in shared memory, an attempt to acquire a lock to the corresponding tracking memory for the shared memory is performed at 510. To handle the issue of a large number of concurrent threads, each entry in the tracking table has a lock bit that is set by each thread that is trying to modify state. Once the state of the shared memory location is modified by the thread and the hazard detection process is completed, the lock is released. As such, the fine granularity lock that is associated with each entry of the tracking table provides for serialized access to entries in the tracking table, and by inference provides for serialized access to each of the locations in shared memory. In particular, serialization happens for threads accessing the same address, whereas threads accessing different addresses are able to proceed in parallel, thus speeding up execution.

In one embodiment, an attempt to acquire a lock at 510 also provides access to information in the tracking table that relates to previous accesses to the shared memory location. As such, before the current access has been committed or executed, a comparison can be made between any previous access (e.g., the last access) and the current access.

If the lock is acquired, then the process proceeds to 510, where the lock is set, thereby preventing other accesses to the entry, and correspondingly other accesses to the location in shared memory. On the other hand, if the attempt to acquire the lock is not successful, then the process loops back to 510 to again try to acquire the lock. Serialization of accesses to the location occurs, as any attempt to access the location in shared memory will instantiate the attempt to acquire the lock in a corresponding entry of the tracking table. Through the lock, only one thread has access to the lock and corresponding location in shared memory. Any other thread accessing the same address in shared memory has to wait until the lock is available before that thread can access the location in shared memory and its corresponding entry in the tracking table.

The method includes determining at 520 whether an initialization bit is set in association with the corresponding location in shared memory. The initialization bit is included within the corresponding entry of the tracking table. The initialization bit is used to determine whether there have been multiple accesses to the shared memory location. If the initialization bit was set, then this indicates that the shared memory location has been previously accessed, and the method proceeds to 530. On the other hand, if the initialization bit was not set, then this indicates that the current access is the first access to the shared memory location, and the process continues to 525 to determine the type of the current access, and then to 560 where information regarding the type of the current access is updated in the tracking table.

In particular, if the shared memory location was previously accessed, then this is a potential hazard condition. As such, it is determined whether and when a hazard condition exists. This is accomplished by determining at 530 and 540 the type of the previous and current accesses to the shared memory location. Information related to the type (e.g., read and/or write) of the previous access is provided in the tracking table. Additionally, the type (e.g., read and/or write) of the current access is also determined. In one embodiment, this information is parsed from the instruction in the original program accessing the shared memory location. In another embodiment, this information is known based on information stored in local memory related to the current access.

In one embodiment, a hazard condition exists when there are multiple accesses to the same shared memory location. Additional operations may be performed to identify the type of hazard. Hazard types are further described in relation to FIG. 8. When a hazard condition exists, and if it is of a type that warrants reporting, then the hazard is reported at 550. In one embodiment, the reports are generated and placed into a buffer. When the buffer is full, then an exception is thrown and the hazards are cleared from the buffer and reported to the host processor for use by the programmer.

When the state of the tracking table indicates that the second access will cause a conflict, then an updating thread will store the conflict information into the tracking table. Specifically, the method at 560 includes updating the tracking table with information related to the current access, to include information related to the corresponding instruction causing the access and/or conflict. For instance, information about the previous access and the current access are stored. Also, the type of hazard condition is identified. That is, information related to the hazard and the instruction causing the hazard can be determined and reported. Further, the location of the hazard as triggered by instructions in the original code is identified and reported. In that manner, the programmer is able to identify the location (e.g., program counter of the instruction in the program) where possible fixes may be entered. Additionally, the address of the shared memory location is also identified and stored.

The method also includes setting the initialization bit at 570 for the current access, in one implementation. This is performed for each access to the location in shared memory, even if the initialization bit has already been set by a previous access.

At 580, the lock is released. In that manner, other accesses from threads in that block of threads are able to execute to that shared memory. It is important to note that other threads that are not accessing a locked memory are still able to execute within the hardware unit.

In one embodiment, the state of the tracking table is reset when all threads in the context are known to be synchronized (either implicitly by the entry/exit points, or explicitly by the use of a context wide synchronization primitive such as a barrier). In other words, the tracking table is reset at the beginning of a barrier region. In that manner, shared memory hazards are identifiable through the state tracking information.

Figure 6:
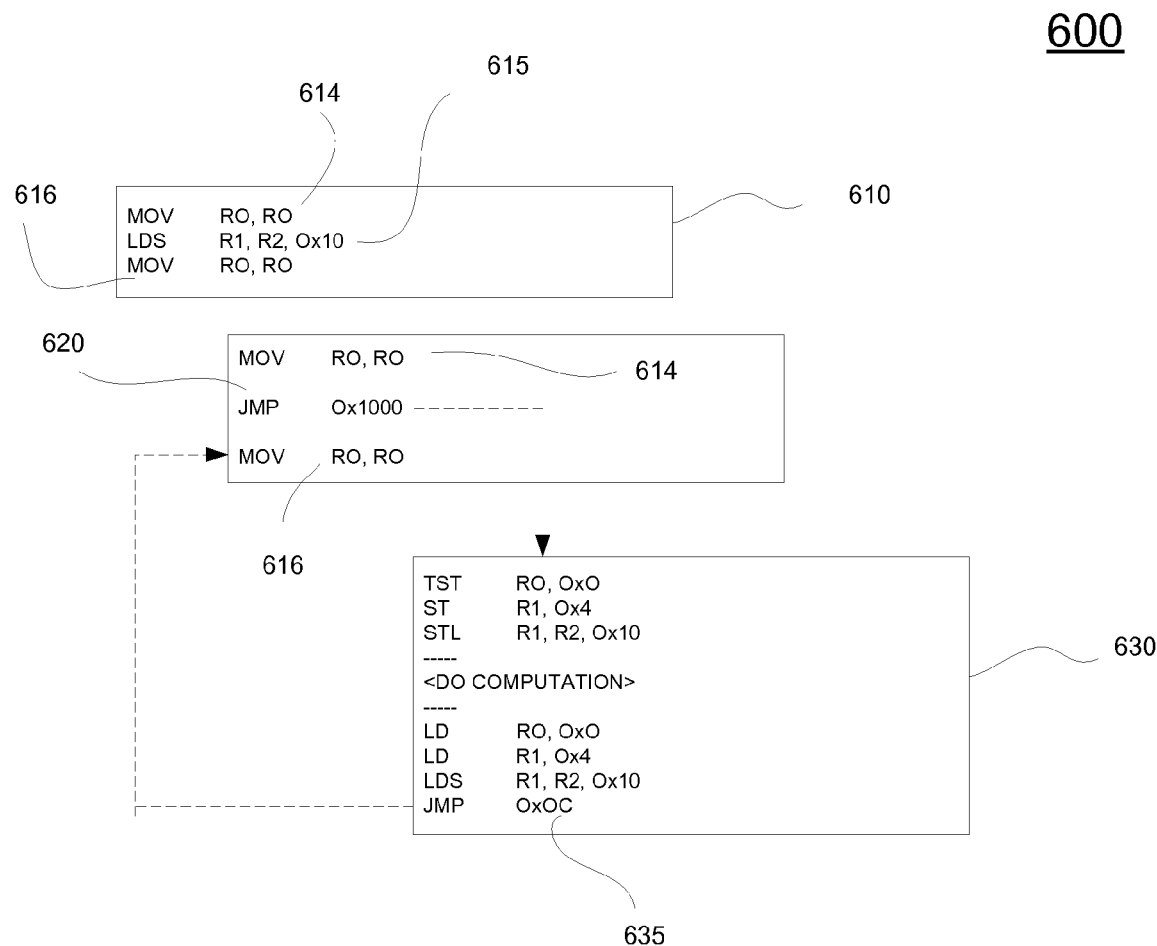
FIG. 6 is a diagram illustrating software patching of an original, executable code of a program to perform online detection of race conditions in the executable code, in accordance with one embodiment of the present disclosure.

FIG. 6 is a diagram 600 illustrating software patching of an original, executable code 610 of a program to perform online detection of race conditions in the executable code, in accordance with one embodiment of the present disclosure. In particular, diagram 600 illustrates the binary patch 630 that is added and/or replaces the original instruction 615 in the original code 610 that accesses the shared memory location (not shown).

For instance, instructions in the original code 610 are exemplary and are provided for illustration only. Instruction 615 is a load or store instruction to place a value into a shared memory location (not shown). Instruction 615 is located between instructions 614 and 616. As shown, the execution of the patch 630 is implemented by substituting a jump instruction 620 for the original instruction 615 accessing the shared memory location. The jump instruction 620 directs execution to an address containing the software patch 630, so that the hazard identification code in patch 630 is executed. As such, instead of directly performing the load/store instruction 615, the hazard identification code in the patch 630 is performed.

Computation in the hazard identification code provided in patch 630 includes the original instruction 615 so that it will be executed along with successful completion of the patch 630. In particular, the hazard identification code in the patch identifies the hazard through the use of a corresponding tracking table, stores information related to the hazard, and is configurable to report the hazard condition.

At the end of the software patch 630, the executable code returns to the next instruction 616 in the original code using another jump instruction 635, right after the instruction accessing the shared memory. Appropriate offsets are used in the software patch 630 to properly track program counters associated with instructions in the original code 610.

Figure 7:
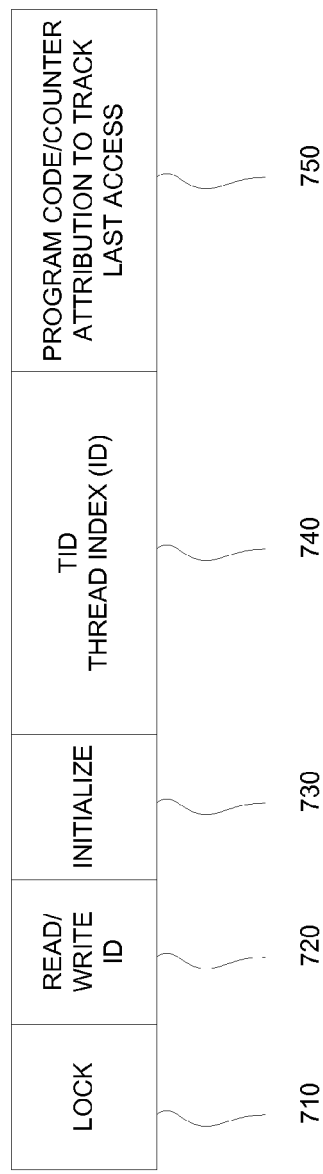
FIG. 7 is a diagram illustrating an entry in the tracking table used for performing online detection of race conditions in the executable code, in accordance with one embodiment of the present disclosure.

FIG. 7 is a diagram illustrating an entry 700 in a tracking table used for performing online detection of race conditions in the executable code, in accordance with one embodiment of the present disclosure. Entry 700 corresponds to a particular location in shared memory that is allocated to a hardware unit or block-processor, and includes information related to accesses to the location. Information included in entry 700 is associated with a previous access and can be used in comparison with information related to a current access. Depending on the size of entry 700, information related to one or more previous accesses may be included.

For example, entry 700 includes a locking indicator 710, which indicates whether the entry is locked for use by a particular thread in a block of threads, or is open for use by any thread. In one embodiment, locking indicator 710 comprises a locking bit, wherein when the locking bit is set, only the lock owner or acquirer has access to entry 700, and correspondingly has access to the shared memory location.

Also, entry 700 includes an access identifier 720 that indicates the type of access is performed on the shared memory location. For instance, in one embodiment, the identifier 720 comprises a read or write access identifier, to indicate whether the previous access is a read access or a write access.

In addition, entry 700 includes initialization information 730 that is used to determine whether there has already been an access to the shared memory location within a block or warp of threads being executed by a unit of hardware or a block processor. As previously described, any access to the shared memory location as updated into entry 700 will indicate that the location has been accessed. This is implemented through setting of the initialization bit, in one embodiment. A thread index (id) 740 is provided when a previous access has occurred and identified.

Once it is determined that the current access is of a type that possibly may trigger a hazard, attribute information 750 associated with the thread is included. For instance, attribute information 750 may include information related to the current access, and includes, but is not limited to the following: a thread index or thread identification, program counter. Once committed, that information is updated into entry 700 of the tracking table for use when comparing to future accesses to the shared memory location. As such, entry 700 includes attribute information related to the previous access.

FIG. 8 is a diagram of a state table 800 indicating when a shared memory hazard occurs in executable code of a program, in accordance with one embodiment of the present disclosure. Table 800 indicates which types of operations are performed for various hazard scenarios. For each row in table 800, information is provided to include initialization information 810, access type information 820 for the previous access, access type information 830 for the current access, and action items 840. After every access has been committed, information related to the current access is updated into the corresponding tracking table, as previously discussed.

For instance, row 850 provides information related to a first access to a shared memory location. As such, the initialization bit has not been set (e.g., "0"). In that case, action items include updating tracking information related to the current access in the corresponding tracking table, and the lock is released.

Row 860 is related to a possible hazard. In particular, the initialization bit is set (e.g., "1") to indicate that a previous access to the same location has been made. Information related to the previous and current access indicates that both the accesses are read accesses. In one embodiment, a read after read (R/R) scenario is not a hazard, even though there were multiple accesses, since there the data remains the same in shared memory, and the execution of the code will give the same result no matter the order. As such, action items include updating tracking information and releasing the lock.

Row 870 is related to a possible hazard. The initialization bit is set. Information related to the previous and current accesses indicates a write after read (W/R or WAR) access. This may trigger a hazard depending on user preference since reordering of the operations may provide a different result. The initialization information is set, and the tracking information is updated. A report related to the hazard may be reported depending on user preference. Also, the lock is released.

Row 880 is related to another possible hazard. The initialization bit is set indicating multiple accesses to the same shared memory location. Information related to the previous and current access indicates a read after write (R/W or RAW) access. This may trigger a hazard, depending on user preference since reordering of the operations may provide a different result. The hazard is reported depending on user preference. For instance, the hazard is generated and delivered to a buffer. The buffer could report an exception when the buffer is full, to allow it to be emptied. The initialization information is set, and the tracking information is updated. The lock is released.

Row 890 is related to another possible hazard. The initialization bit is set indicating multiple accesses to the same shared memory location. Information related to the previous and current accesses indicates a write after write (W/W or WAW) access. This may trigger a hazard, since reordering of operations may provide a different result. The hazard is reported depending on user preference. For instance, the hazard is generated and delivered to a buffer for reporting when the buffer is full, through an execution. The initialization information is set, and the tracking information is updated. The lock is released.

Heterogeneous Filtering Framework for Shared Memory Data Access Hazard Reports

Embodiments of the present invention disclose tools for reporting data access hazards. In particular, separate online and offline components are configured to detect race conditions when accessing shared memory and to report hazards. Heuristics are used to assign priorities to records. These heuristics can run in either an online component or an offline one. For instance, the online component applies filtering with low overhead, faster heuristics to prevent generation of unimportant records. More expensive heuristics with high overhead are applied to assign priorities to hazards so that the user can quickly identity hazard reports that are important. Additionally, the offline component is configurable to apply GPGPU specific heuristics, such as, those for avoiding reporting of hazards due to warp level programming. As a result, embodiments of the present invention are suitable for avoiding false positive data hazards, wherein the information about the hazard of interest is hidden among other hazard reports, such as in GPGPU applications having a large number of concurrent threads.

Figure 9:
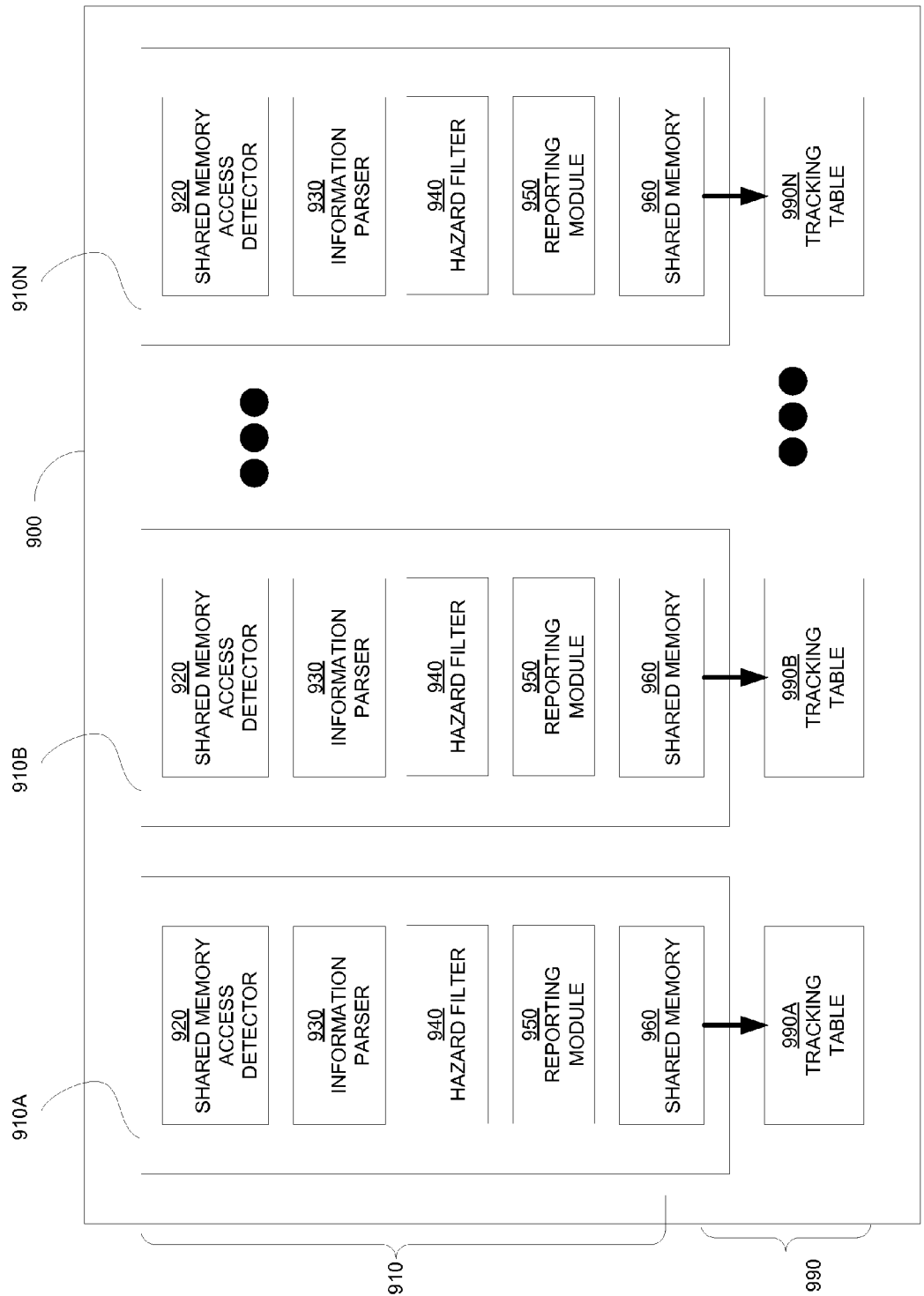
FIG. 9 is a block diagram of an exemplary multi-threaded processing system configured to implement online detection of race conditions in executable code of a program, and the reporting of those race conditions, in accordance with one embodiment of the present disclosure.

FIG. 9 is a block diagram of an exemplary multi-threaded processing system 900 configured to implement online detection of race conditions in executable code of a program, and to identify reportable race conditions, in accordance with one embodiment of the present disclosure. The processing system may be implemented within systems 100 and 200 of FIGS. 1 and 2, in embodiments of the present invention.

As shown in FIG. 9, processing system 900 includes a plurality of units of hardware or block processors 910, including block processor 910A, 910B, and on up to 910N. For instance, processing system 900 may comprise a central processing unit (CPU), graphics processing unit (GPU), general purpose graphics processing unit (GPGPU), etc. In a multi-threaded environment, each block processor is configured to perform specialized functions or general purpose instruction, and may include various types of memory and a tracking table. Additionally, each block processor is configured to concurrently execute a group or block of threads. For instance, each block multi-processor may comprise one or more stream processors, each of which handles one or more threads in a group of threads that is assigned to a particular block by a scheduler (not shown) or operating system (not shown). In one implementation, a warp size defines the group or number of threads that are running concurrently within a block processor.

For illustration, each block processor may include various components, such as, arithmetic logic unit (not shown), branching units (not shown), etc. As a representative example of the block processors in the plurality of block processors 910, the components of block processor 910A are described. For instance, block processor 910A is assigned shared memory 960 used for executing instructions in a program, or portions of a program. That is, shared memory is included that can be read or written to by any thread as executed by the block processor 910A. In one embodiment, shared memory 960 is located in block processor 910A. In another embodiment, shared memory 960 is located outside block processor 910A, but within processing system 900. In still another embodiment, shared memory 960 is separately or remotely located.

Additionally, processing system 900 includes a plurality of tracking tables 990. In particular, each block processor is associated with a corresponding tracking table in a one-to-one relationship, in one embodiment. For instance, block processor 910A is associated with tracking table 990A, block processor 910B is associated with tracking table 990B, and block processor 910N is associated with tracking table 990N. In one embodiment, tracking table 990A is located in block processor 910A. In another embodiment, tracking table 990A is located outside block processor 910A, but within processing system 900, such as, within global memory. In still another embodiment, tracking table 990A is separately or remotely located.

The tracking tables of FIG. 9 are similarly configured as tracking able 220A of FIG. 2. In particular, tracking table 990A includes information that is used to determine multiple accesses to locations in shared memory 960 for block processor 910A. For instance, initialization information is included within tracking table 990A for a corresponding location (e.g., byte of memory) in shared memory 960. Additional information related to accesses to locations in shared memory may be included within tracking table 990A.

Each of the plurality of block processors 910 are configured to perform online detection of race conditions to shared memory, and for identifying reportable race conditions. A race condition exists when two or more accesses to a location in shared memory occurs, such that the order of execution between the two threads are not guaranteed as it is processed through hardware. This may create divergent results.

For instance, as a representative block, block processor 910A includes a shared memory access detector 920 for identifying a potential conflict caused by an instruction in a program accessing a location in shared memory. More particularly, the shared memory access detector 920 is configured to identify a second access to the location in shared memory 217 between one or more threads of a block or warp of threads executed within a barrier region of the program. The identification of the second access to the location is based on initialization information (e.g., a status of an initialization bit) that corresponds to that location.

In addition, each block processor includes an information parser. For instance, block processor 910A includes information parser 930 that is configured to determine first information associated with a first access to the location in shared memory, and second information associated with a second access to the location in shared memory. The parsed information includes access information, such as, the type of access (read and/or write), program counter, the instruction, attribute information to identify the instruction, address associated with the location, and other information used for determining hazards.

Each block processor in the plurality 910 includes a hazard filter. For instance, block processor 910A includes hazard filter 940 that is configured to determine whether the first information and the second information matches filter criteria, wherein the filter criteria is used to identify hazards. As an example, the filter criteria may be used to indicate when the instruction causes a reportable hazard, or the filter criteria may be used to indicate when the instruction does not cause a reportable hazard. As such, the filter criteria may be used to filter through reportable hazards and/or to filter out non-reportable hazards.

Also, each of the plurality of block processor 910 includes reporting module. For instance, block processor 910 includes reporting module 950 that reports the instruction when the instruction causes a reportable hazard.

In addition, hazard detection and reporting is implemented as two components within processing system 900. Specifically, an online component is executed on the same architecture where the hazard detection tool detects a potential conflict, but before the hazard report is generated. Hazards that do not match some filter criteria, or match other filter criteria, are not allowed to generate reports. The internal state of the hazard tracking tool is updated and the system continues execution. Once the hazard reports are gathered, an offline component is run. The offline component applies more complex heuristics to further prioritize the hazard reports. For instance, a priority module (not shown) is configured to assign priority to the reportable hazard based on the first information and the second information. Finally, these priorities are embedded into the hazard reports so that a frontend tool can use this information to guide presentation to the user.

Figure 10:
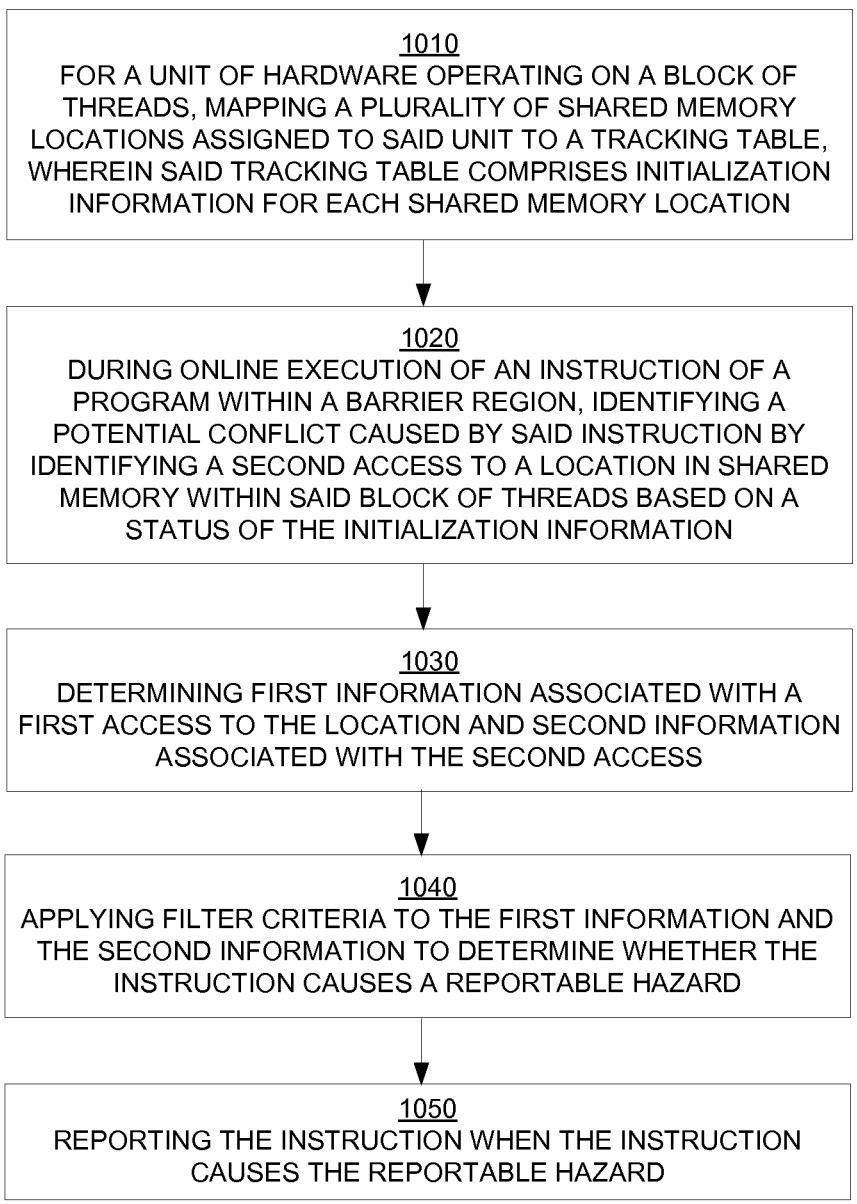
FIG. 10 is a flow diagram illustrating a computer-implemented method for online detection and reporting of reportable race conditions present in executable code of a program, in accordance with one embodiment of the present disclosure.

FIG. 10 is a flow diagram 1000 illustrating a computer-implemented method for online detection and reporting of reportable race conditions present in executable code of a program, in accordance with one embodiment of the present disclosure. In another embodiment, flow diagram 1000 is implemented within a computer system including a processor and memory coupled to the processor and having stored therein instructions that, if executed by the computer system causes the system to execute a method for online detection and reporting of reportable race conditions in executable code of a program. In still another embodiment, instructions for performing a method are stored on a non-transitory computer-readable storage medium having computer-executable instructions for causing a computer system to perform a method for online detection and reporting of reportable race conditions in executable code of a program. The method outlined in flow diagram 1000 is implementable by one or more components of systems 100, 200, and 900 of FIGS. 1, 2, and 9, respectively.

Embodiments of the present invention provide for detection and reporting of shared memory hazards through binary modification of the executable, which reduces the need for additional debug information. This allows for the detection and filtering of hazards in optimized applications, as well as applications for which source code may not be available. In particular, at the assembly and/or binary level, the executable code is rewritten with a patch for every instruction that is accessing shared memory space, such as, reads and writes (e.g., loads and stores). The shared memory space was previously allocated to a block or unit processor, such that threads assigned for execution by the block processor can access that shared memory space. The binary patch includes code that performs hazard identification, filtering, and tracking of the hazard, to include types of hazards, and where in the original code (to include offsets) the hazard exists. A description of binary modification is provided in relation to FIG. 6.

The method includes mapping a plurality of shared memory locations to a tracking table at 1010. The plurality of shared memory locations is allocated to a unit of hardware (e.g., block processor) that is configured to operate on a block or warp of threads. For instance, in one implementation, the unit of hardware comprises a streaming or shader multi-processor, which is a component of a GPU. Each unit of hardware operates on one or more blocks or warps of threads of execution. In one embodiment, hardware units correspond to tracking tables in a one-to-one relationship.

As previously described, the tracking table is created for storing tracking data related to a corresponding shared memory that is allocated to a corresponding hardware unit. In one embodiment, the tracking table is stored in global memory, and is not accessible to the program user, or the original program. More particularly, the tracking table includes information related to accesses of the shared memory. For instance, a given entry in the tracking table provides information related to accesses (e.g., previous and current accesses) for a particular location in shared memory, such as, type of accesses (e.g., reads or writes), attribute information related to the thread identifiers of the accesses, attribute information related to the instruction of the program, attribute information related to the shared memory location, etc. In particular, the tracking table entry includes initialization information (e.g., an initialization bit) for each shared memory location, wherein the initialization information indicates whether the corresponding location has been previously accessed by an instruction.

At 1020, the method includes, for an instruction of an original program that is located within a barrier region, identifying a potential shared memory access conflict caused by the instruction. Identification of the potential conflict is performed during online execution of the program through the hardware. This is accomplished by identifying a second access to a location in shared memory within a block or warp of threads. In one embodiment, the first and second accesses to the location are executed between two threads in the block of threads. Also, the two accesses (e.g., the first and second accesses) occur within a barrier region, wherein the barrier region is defined between two states where all the threads in a program are known to be synchronized, either implicitly by the entry/exit points, or explicitly by the use of a block wide synchronization primitive such as a barrier instruction.

In one embodiment, the identification of multiple accesses to the location is achieved through initialization information, as previously disclosed in relation to FIGS. 2-8. For instance, subsequent accesses to a location in shared memory are known based on the status of an initialization bit.

At 1030, the method includes determining first information that is associated with a first access to the location in shared memory. Also, second information is determined, wherein the second information is associated with the second access to the location. The first and second information includes access information, such as, the type of access (read and/or write), program counter, the instruction, thread identifiers, attribute information to identify the instruction, address associated with the location, and other information used for determining hazards.

At 1040, the method includes applying filter criteria to the first and second information to determine whether the instruction causes a reportable hazard. The filter criteria is used to prevent reports in the online phase, and can be enabled or disabled on demand, in embodiments. That is, during the online phase, the filter criteria is performed during execution of the program so that only reportable hazards are identified using low overhead heuristics. In this manner, some false positives are removed from the reporting process. In the offline phase, the same filter heuristics can also be used in the assignment of priorities to reports. For any given heuristic, the choice of whether to implement it in the online or offline phase depends on the cost of evaluating the heuristic while running.

For instance, in one implementation, the filter criteria indicates that the instruction causes a reportable hazard when the two different threads access the same location in shared memory. Correspondingly, in another implementation, different filter criteria indicates that the instruction does not cause a reportable hazard when the same thread accesses the location in both the first and second accesses. Execution of the same thread through the block processor provides for inherent and repeatable ordering of the first and second accesses to the location in shared memory.

In one implementation, the filter criteria indicates that the instruction does not cause a reportable hazard when threads of the first and second accesses are defined within a warp. Specifically, threads within a warp operate in lock step and are inherently ordered. As such, the ordering of the first and second accesses are repeatable at each execution of the program, and does not cause a hazard.

In still another implementation, the filter criteria indicates that the instruction does not cause a reportable hazard when the same or identical value is written to the location in both the first and second accesses to the location in shared memory. That is, no matter the order of execution of the first and second accesses to the location when executing the program multiple times, the value in the location most likely will remain the same, and as such does not cause a hazard. This is especially true when there are no intervening accesses.

The filter criteria can also be used to determine the priority of a hazard, to indicate its severity. This is implemented in both an on-line components that are executed while the application executes and offline components that are executed once all or part of the online execution is complete.

At 1050, the instruction is reported when the instruction causes a reportable hazard. As will be further described, reportable hazards are prioritized during an offline process, wherein the priority assigned to the reportable hazard is based on information related to the first and second accesses to the location in shared memory. For instance, the priority assigned may include various gradations, such as, high priority, medium priority, and low priority. These priorities may include other labeling, such as, error (e.g., relatively high and/or medium priorities) and warning or informational (e.g., relatively low priority).

Figure 11:
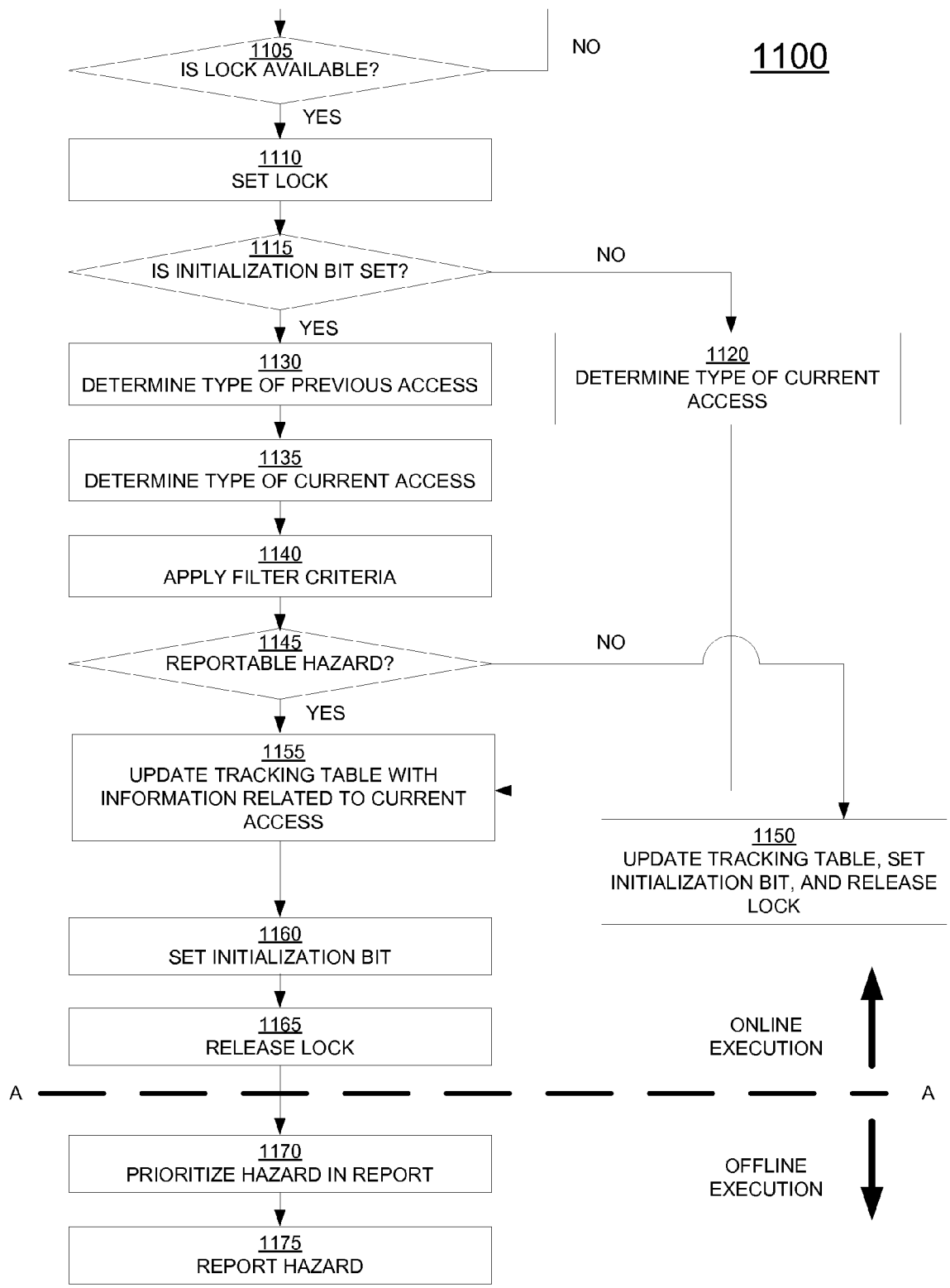
FIG. 11 is a flow diagram illustrating a computer implemented method for detection and reporting of reportable race conditions in executable code of a program, wherein the process includes an online portion implementing low overhead heuristics to prioritize and filter reportable hazards, and an offline portion implementing complex, higher overhead heuristics to further prioritize and filter reportable hazards, in accordance with one embodiment of the present disclosure.

FIG. 11 is a flow diagram 1100 illustrating a computer implemented method for detection and reporting of reportable race conditions in executable code of a program, wherein the process includes an online portion implementing low overhead heuristics to filter reportable hazards, and an offline portion implementing complex, higher overhead heuristics to prioritize reportable hazards, in accordance with one embodiment of the present disclosure. In another embodiment, flow diagram 1100 is implemented within a computer system including a processor and memory coupled to the processor and having stored therein instructions that, if executed by the computer system causes the system to execute a method for detection and reporting of reportable race conditions in executable code of a program, wherein the process includes an online portion implementing low overhead heuristics to filter reportable hazards, and an offline portion implementing complex, higher overhead heuristics to prioritize reportable hazards. In still another embodiment, instructions for performing a method are stored on a non-transitory computer-readable storage medium having computer-executable instructions for causing a computer system to perform a method for detection and reporting of reportable race conditions in executable code of a program, wherein the process includes an online portion implementing low overhead heuristics to filter reportable hazards, and an offline portion implementing complex, higher overhead heuristics to prioritize reportable hazards, as outlined in flow diagram 1100. The method outlined in flow diagram 1100 is implementable by one or more components of systems 100, 200, and 900 of FIGS. 1, 2, and 9, respectively.

The method outlined in FIG. 11 is performed at each access to a location in shared memory within a block or warp of threads as executed by a block-processor. The block-processor has allocated shared memory, to include one or more locations in shared memory. Additionally, a corresponding tracking table includes entries that correspond to each location. The method outlined in FIG. 11 is performed to identify reportable shared memory hazards present within instructions that occur within a barrier region, as previously discussed.

Embodiments of the present invention are implemented through online and offline portions as indicated by line A-A. Processes performed above line A-A are performed online along with the execution of the program in hardware, and not through simulation. Processes performed below line A-A are performed offline after execution of the program in hardware. For instance, during online execution, hazards are identified through filtering out of false positives, and other low priority hazards that meet certain filter criteria. These low priority hazards are not reportable hazards.

The processes performed at 1105 and 1110 are similar to the processes performed at 510 and 520 of FIG. 5, and the description related to 510 and 520 are applicable for operations outlined in 1105 and 1110. For instance, at each access to the location in shared memory, an attempt to acquire a lock to the corresponding tracking memory for the shared memory is performed at 1105. The lock provides for serialized access to entries in the tracking table, and by inference provides for serialized access to each of the locations in shared memory. Once acquired, the lock is set in 1110, thereby preventing other accesses to the entry in the table. If not acquired, then the process loops back to 1105 to again try to acquire the lock.

At 1115, it is determined whether an initialization bit is set in association with the corresponding location in shared memory to determine whether there have been multiple accesses to the location. If the initialization bit was set, then this indicates that the shared memory location has been previously accessed, and the method proceeds to 1130. On the other hand, if the initialization bit was not set, then this indicates that the current access is the first access to the shared memory location, and the process continues to 1120 to determine the type of the current access, and then to 1155 where information regarding the type of the current access is updated in the tracking table.

At 1130, upon determining that the current access is at least a second access to the location, the type of the previous access is determined. Also, at 1135, the type of the current access is determined. In general, the type includes information related to the access, such as, the type of access (read and/or write), program counter, the instruction, attribute information to identify the instruction, address associated with the location, and other information used for determining hazards.

At 1140, filter criteria is applied to determine whether the current access causes a shared memory conflict that is reportable. More specifically, the online application of filter criteria and/or heuristics are used to filter out false positives and other low priority hazards. For instance, false positive conditions include accesses to the same shared memory location by the same thread, or a subsequent hazard that is caused by a previously reported hazard.

At 1150, it is determined whether the instruction causes a reportable hazard, given that there are two accesses to the same location within a barrier region of the executable program. For instance, the filter criteria may indicate a reportable hazard when two different threads are accessing the location in shared memory. Also, the filter criteria may indicate that the instruction is a non-reportable hazard under the following conditions: when the same thread accesses the location in the first and second accesses; when threads of the first and second accesses are defined within a warp; and when the first access and the second access writes identical values to the location. In other embodiments, other filter criteria is used to identify reportable hazards, and/or filter out non-reportable hazards.

If it is determined that the instruction does not cause a reportable hazard, then the process proceeds to 1150 to update the tracking table with information related to the current access, set the initialization bit and, and to release the lock. Execution of the instruction is also performed before exiting the hazard detection and reporting process.

On the other hand, if it is determined that the instruction causes a reportable hazard, then the process proceeds to 1155 to update the tracking table with information related to the current access. That is an updating thread will store the conflict information into the tracking table. For instance, information related to the current and previous accesses are stored, to include information related to the corresponding instruction causing the access and/or conflict. Also, the type of hazard condition is identified. That is, information related to the hazard and the instruction causing the hazard can be determined and reported. Further, the location of the hazard as triggered by instructions in the original code is identified and reported. In that manner, the programmer is able to identify the location (e.g., program counter of the instruction in the program) where possible fixes may be entered. Additionally, the address of the shared memory location is also identified and stored.

At 1160, the initialization bit is set. This is performed for each access to the location in shared memory, even if the initialization bit has already been set by a previous access.

At 1165, the lock is released. In that manner, other accesses from threads in that block of threads are able to execute to that shared memory. It is important to note that other threads that are not accessing a locked memory are still able to execute within the hardware unit.

At this point the online execution of the hazard detection and reporting process is complete. Additional online processes may be implemented, such as, execution of the instruction, and return back to the next instruction after the original instruction in the original code for execution.

At 1170 and 1175, the off-line portion of the method outlined in FIG. 11 is performed. For instance, an offline portion of the hazard detection and reporting process is performed to implement high overhead, complex heuristics. In particular, the hazards that are generated and pass the earlier filtering (e.g., to identify false positives and low priority hazards) go through an additional prioritizing operation. That is, hazards are prioritized at 1170 according to heuristics that are applied against the tracking data (e.g., based on the data contained in the first and second accesses). Lower priority hazards may include same thread accessing a shared memory location, the same value stored into a shared memory location, and/or cases where a hazard may be intended by the user as a result of warp level programming. A high priority hazard may include two threads accessing a shared memory location simultaneously. These priorities are embedded into the hazard reports so that a frontend tool can use this information to guide presentation to the user.

At 1175, for the instruction causing a reportable hazard, a hazard report is generated. The report is reported to the user. In one embodiment, the report is placed into a buffer that is emptied when full.

Embodiments of the present invention provide for run time detection of shared memory hazards using a fixed size tracking table that is associated with one or more block processors. Embodiments provide for detection of actual data access hazards through the implementation of online execution of hazard detection. Other embodiments provide for byte level accuracy for identifying shared memory access. Still other embodiments provide for online and offline detection of reportable shared memory hazards, wherein the online portion implements low overhead filter criteria to identify reportable hazards and to filter out false positives, and wherein the offline portion implements higher overhead heuristics to implement high overhead, complex heuristics to include prioritizing the reportable hazards to guide user presentation.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments.

The invention claimed is:

1. A method for reporting race conditions, comprising:
   for a unit of hardware operating on a block of threads, mapping a plurality of shared memory locations assigned to said unit to a tracking table, wherein said tracking table comprises an initialization information for each shared memory location;
   during an online execution of an instruction of a program within a barrier region, identifying a potential conflict caused by said instruction by identifying a second access to a location in shared memory within said block of threads based on a status of said initialization information;
   determining first information associated with a first access to said location and second information associated with said second access;
   applying filter criteria to said first information and said second information to determine whether said instruction causes a reportable hazard; and
   reporting said instruction when said instruction causes said reportable hazard.

2. The method of claim 1, further comprising:
   executing said instruction without reporting said instruction when said instruction does not cause said reportable hazard.

3. The method of claim 1, wherein said applying filter criteria comprises:
   determining said instruction does not cause said reportable hazard when a thread accesses said location in said first access and said second access.

4. The method of claim 1, wherein said applying filter criteria comprises:
   determining said instruction does not cause said reportable hazard when threads of said first access and said second access are defined within a warp.

5. The method of claim 1, wherein said applying filter criteria comprises:
   determining said instruction does not cause said reportable hazard when said first access and said second access writes identical values to said location.

6. The method of claim 1, wherein said identifying a potential conflict comprises:
   determining said instruction causes said reportable hazard when a first thread accesses said location in said first access and a second thread accesses said location in said second access.

7. The method of claim 6, further comprising:
   assigning a priority to said hazard based on said first information and said second information.

8. The method of claim 7, further comprising:
   performing said assigning said priority offline.

9. The method of claim 7, wherein said priority is taken from a group consisting essentially of error, warning, and informational.

10. A system for reporting race conditions, comprising:
    a plurality of units of hardware operating on a plurality of blocks of threads;
    a plurality of tracking tables, wherein units correspond to tracking tables in a one-to-one relationship, wherein each of said tracking tables comprises initialization information for a corresponding location of a plurality of shared memory locations assigned to a corresponding unit;
    a shared memory access detector for identifying a potential conflict caused by said instruction by identifying a second access to a location in shared memory within said block of threads based on a status of said initialization information, wherein said second access is associated with an online execution of an instruction of a program within a barrier region;
    an information parser for determining first information associated with a first access to said location and second information associated with said second access;
    a filter for determining whether said first information and said second information matches filter criteria indicating said instruction causes a reportable hazard; and
    a reporting module for reporting said instruction when said instruction causes said reportable hazard.

11. The system of claim 10, further comprising:
    a priority module for assigning a priority to said reportable hazard based on said first information and said second information.

12. The system of claim 11, wherein said priority is taken from a group consisting essentially of error, warning and informational.

13. The system of claim 11, wherein said priority module assigns said priority offline.

14. The system of claim 10, wherein said filter criteria is configured to indicate said instruction does not cause said reportable hazard when a thread accesses said location in said first access and said second access.

15. The system of claim 10, wherein said filter criteria is configured to indicate said instruction does not cause said reportable hazard when threads of said first access and said second access are defined within a warp.

16. The system of claim 10, wherein said filter criteria is configured to indicate said instruction does not cause said reportable hazard when said first access and said second access writes identical values to said location.

17. A non-transitory computer-readable medium having computer executable instructions for performing a method for reporting race conditions, comprising:

for a unit of hardware operating on a block of threads, mapping a plurality of shared memory locations assigned to said unit to a tracking table, wherein said tracking table comprises an initialization information for each shared memory location;

during an online execution of an instruction of a program within a barrier region, identifying a potential conflict caused by said instruction by identifying a second access to a location in shared memory within said block of threads based on a status of said initialization information;

determining first information associated with a first access to said location and second information associated with said second access;

applying filter criteria to said first information and said second information to determine whether said instruction causes a reportable hazard; and reporting said instruction when said instruction causes said hazard.

18. The non-transitory computer-readable medium of claim 17, wherein said method further comprises:

executing said instruction without reporting said instruction when said instruction does not cause said reportable hazard.

19. The non-transitory computer-readable medium of claim 17, wherein said method further comprises:

assigning a priority to said reportable hazard based on said first information and said second information in an offline mode after execution of at least a portion of said program completes.

20. The non-transitory computer-readable medium of claim 17, wherein said method further comprises:

determining said instruction does not cause said reportable hazard when a thread accesses said location in said first access and said second access;

determining said instruction does not cause said reportable hazard when threads of said first access and said second access are defined within a warp;

determining said instruction does not cause said reportable hazard when said first access and said second access writes identical values to said location; and determining said instruction causes said reportable hazard when a first thread accesses said location in said first access and a second thread accesses said location in said second access.

* * * * *